Figure 1:
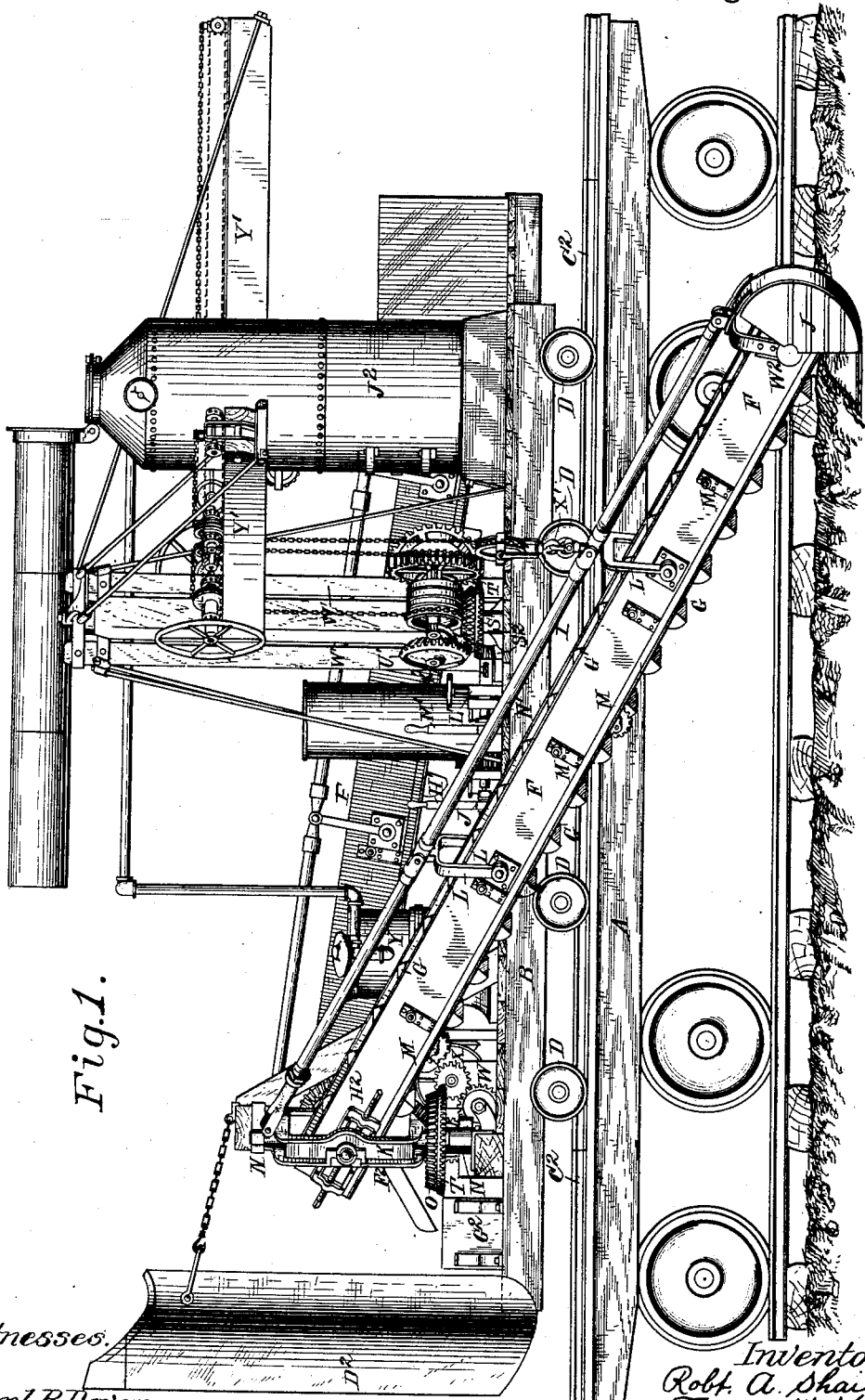

(No Model.)

7 Sheets—Sheet 2.

R. A. SHAILER & F. W. KIMBALL.
DITCHING OR CAR LOADING MACHINE.

No. 367,554.

Patented Aug. 2, 1887.

Witnesses:
Sam'l B. Dover.
Henry J. Haddock.

Inventors.
Robt. A. Shailer,
Francis W. Kimball,
by Albert K. Mansfield (No Model.) 7 Sheets—Sheet 3.

R. A. SHAILER & F. W. KIMBALL.
DITCHING OR CAR LOADING MACHINE.

No. 367,554. Patented Aug. 2, 1887.

WITNESSES:
Henry S. Maddock
G. L. Mansfield

INVENTORS
Robt. A. Shailer
Francis W. Kimball
BY Albert K. Mansfield
ATTORNEY (No Model.) 7 Sheets—Sheet 4.

R. A. SHAILER & F. W. KIMBALL.
DITCHING OR CAR LOADING MACHINE.

No. 367,554. Patented Aug. 2, 1887.

WITNESSES:
Henry S. Maddock
G. L. Mansfield.

INVENTORS
Robert A. Shailer
BY Francis W. Kimball
Albert K. Mansfield
ATTORNEY (No Model.) 7 Sheets—Sheet 5.

R. A. SHAILER & F. W. KIMBALL.
DITCHING OR CAR LOADING MACHINE.

No. 367,554. Patented Aug. 2, 1887.

WITNESSES:
Henry S. Maddock
G. L. Mansfield.

INVENTORS
Robt. A. Shailer
Francis W. Kimball
BY
Albert K. Mansfield
ATTORNEY (No Model.) 7 Sheets—Sheet 6.

R. A. SHAILER & F. W. KIMBALL.
DITCHING OR CAR LOADING MACHINE.

No. 367,554. Patented Aug. 2, 1887.

WITNESSES:
Henry S. Maddock
G. L. Mansfield

INVENTORS
Robt. A. Shailer
Francis W. Kimball
BY
Albert K. Mansfield
ATTORNEY (No Model.) 7 Sheets—Sheet 7.

R. A. SHAILER & F. W. KIMBALL.
DITCHING OR CAR LOADING MACHINE.

No. 367,554. Patented Aug. 2, 1887.

Witnesses:
A. L. Bennitt.
C. I. Hitchcock.

Inventors:
Robt A. Shailer,
Francis W. Kimball,
by A. K. Mansfield
Atty.

UNITED STATES PATENT OFFICE.

ROBERT A. SHAILER, OF CHICAGO, ILLINOIS, AND FRANCIS W. KIMBALL, OF MILWAUKEE, WISCONSIN.

DITCHING OR CAR-LOADING MACHINE.

SPECIFICATION forming part of Letters Patent No. 367,554, dated August 2, 1887.

Application filed December 13, 1886. Serial No. 221,461. (No model.)

*To all whom it may concern:*

Be it known that we, ROBERT A. SHAILER and FRANCIS W. KIMBALL, citizens of the United States, the former residing in Chicago, in the county of Cook and State of Illinois, and the latter residing in Milwaukee, in the county of Milwaukee and State of Wisconsin, have invented certain new and useful Improvements in Ditching or Car-Loading Machines; and we do hereby declare that the following is a full, clear, and exact description thereof, reference being had to the accompanying drawings, and to the letters of reference thereon, which form part of this specification.

Our invention relates to apparatus for excavating and loading material from either side of a railroad-track; and the object of our improvement is to perform by machinery the labor heretofore done by hand. We attain this object by the mechanism illustrated in the drawings, in which—

Figure 2:
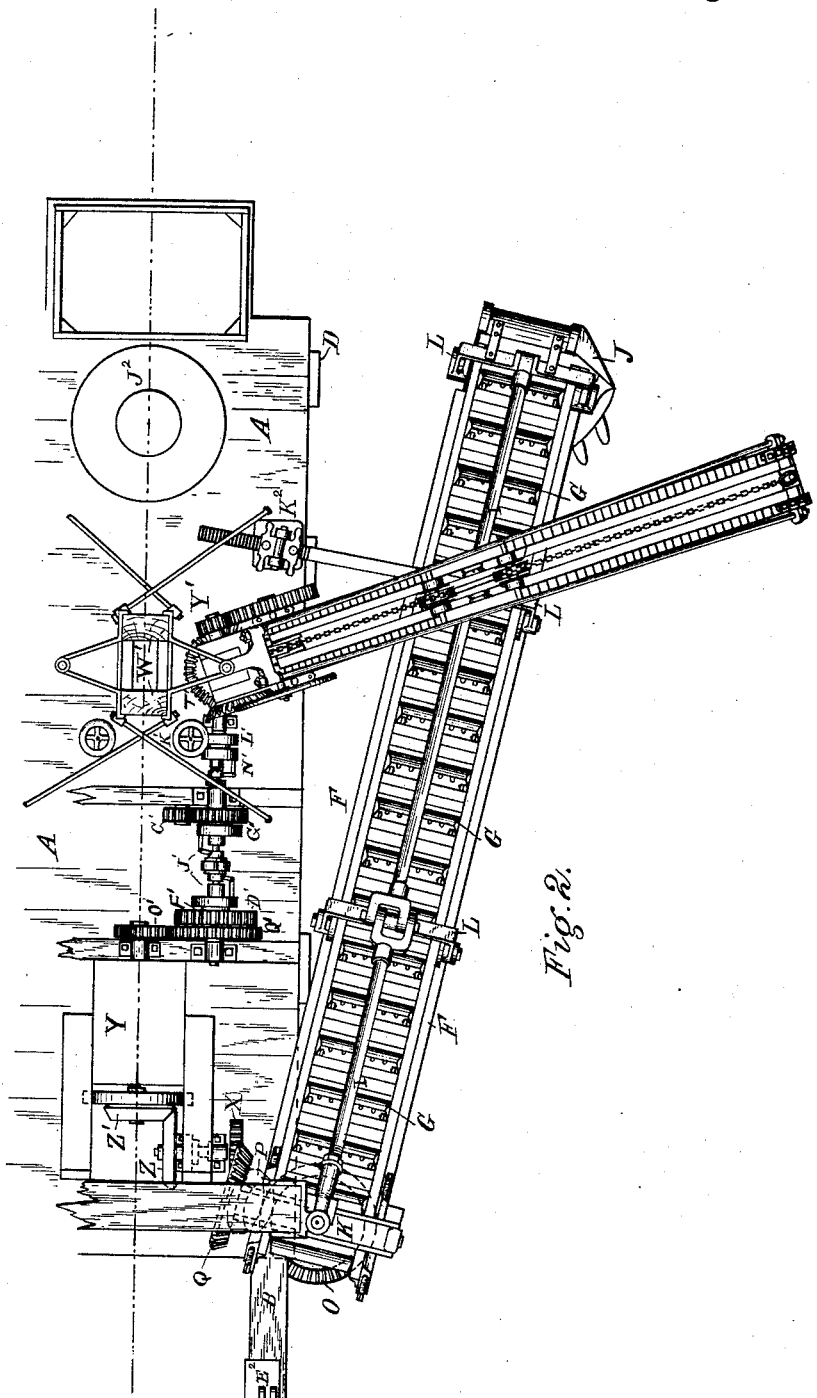
Figure 3:
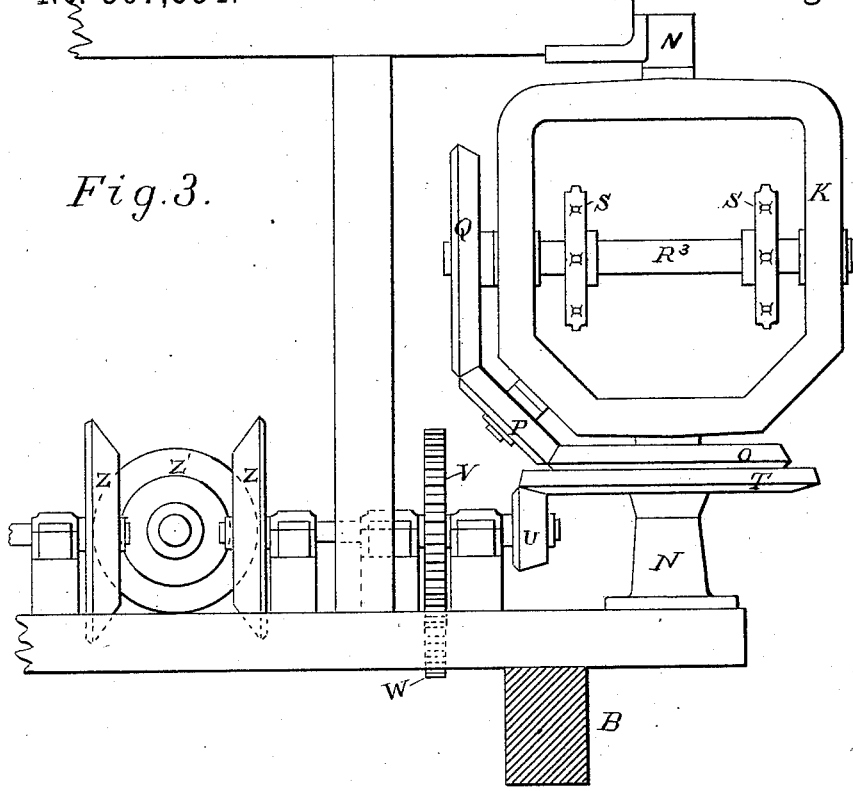
Figure 4:
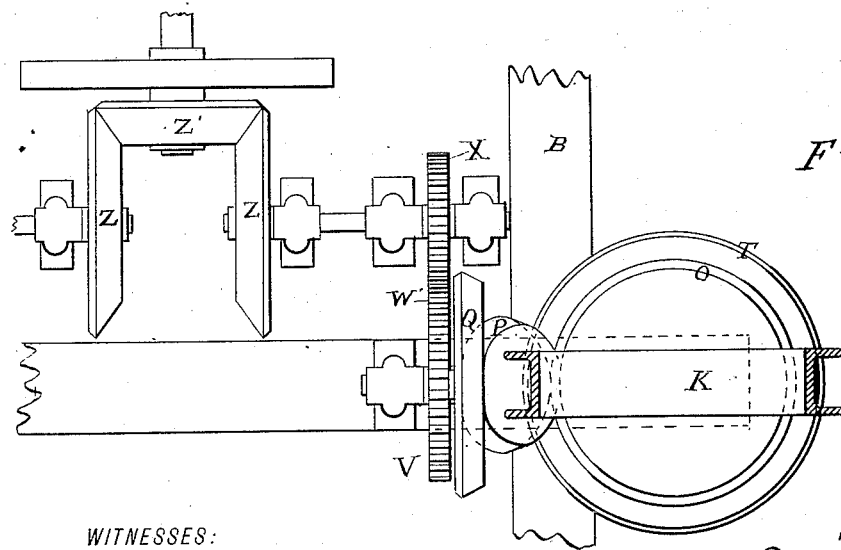
Figure 5:
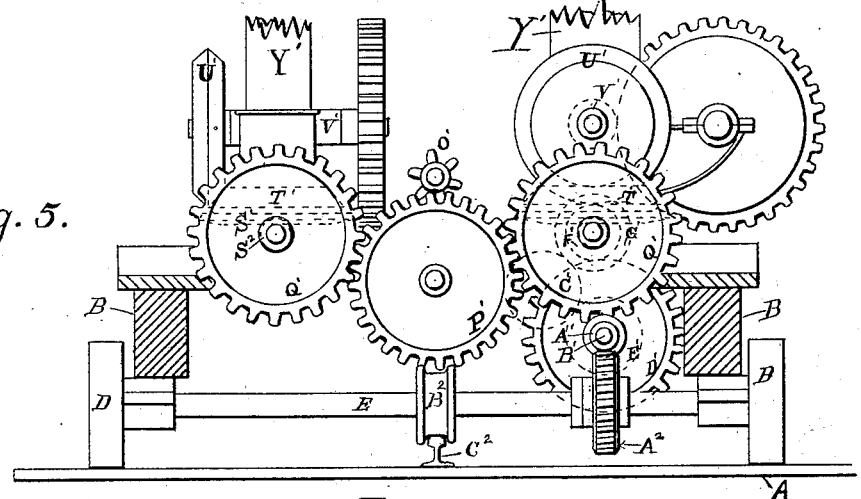
Figure 6:
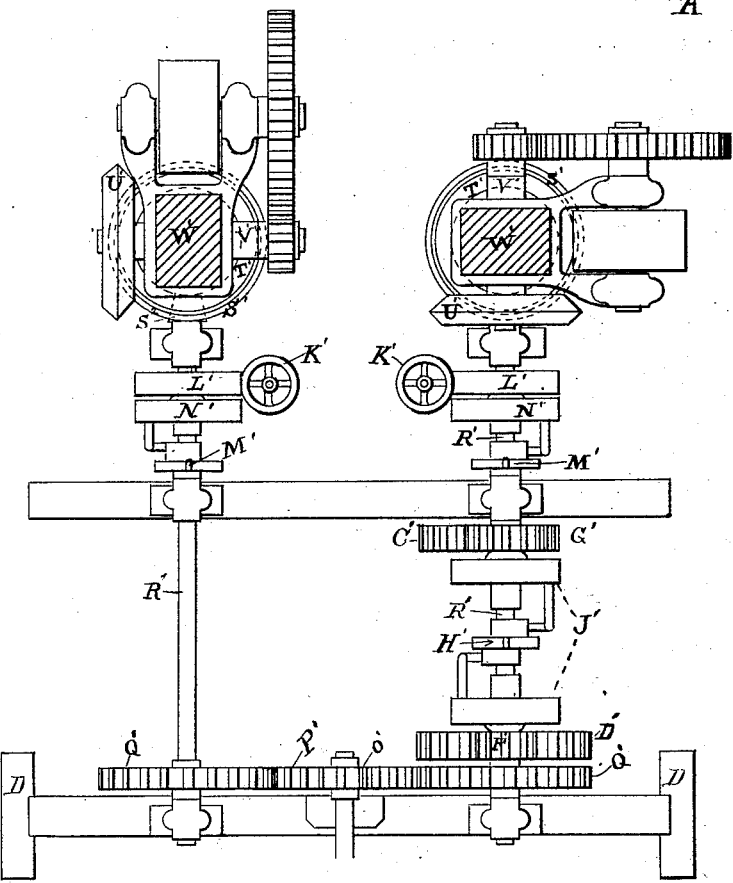
Figure 7:
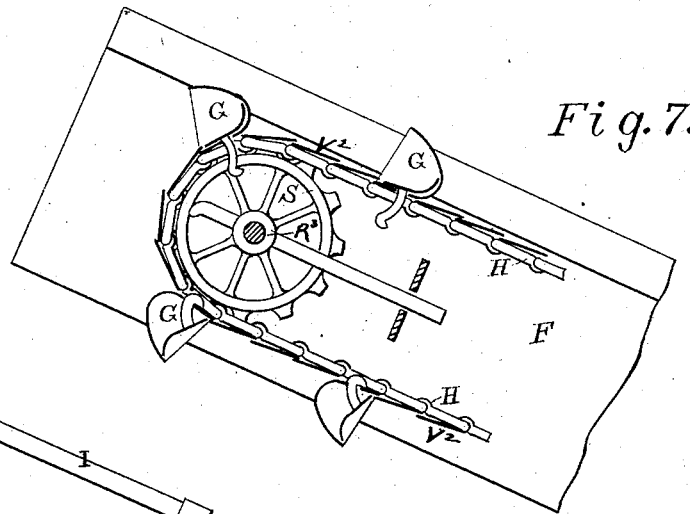
Figure 8:
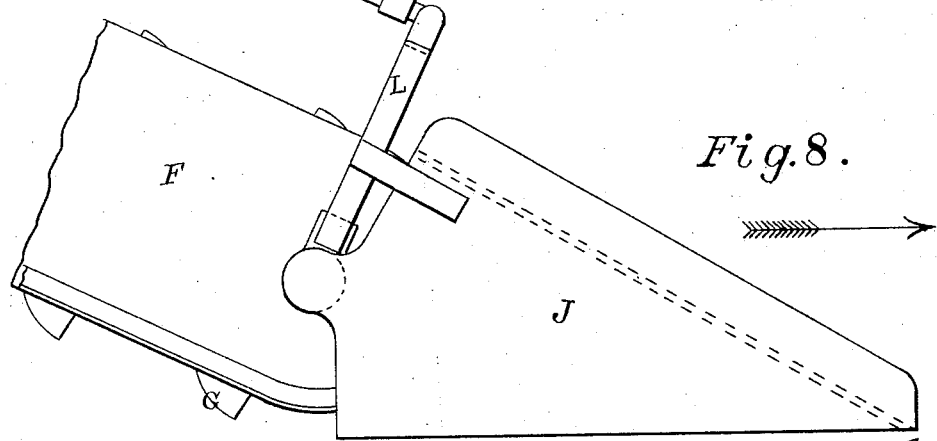
Figure 9:
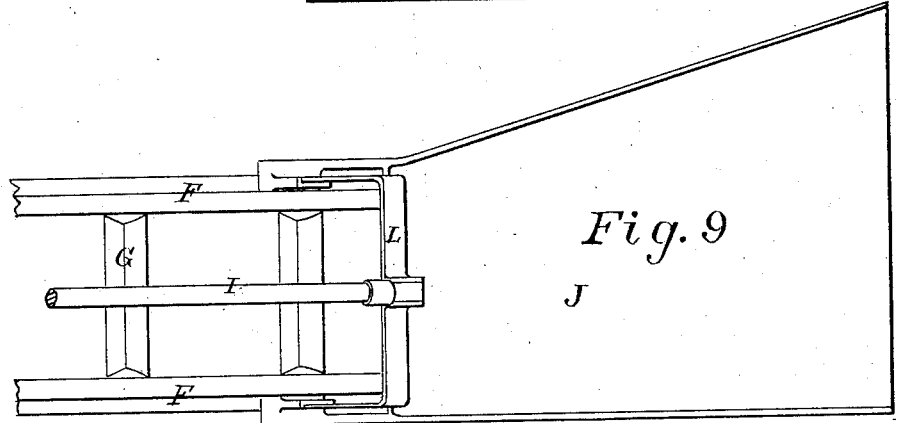
Figure 10:
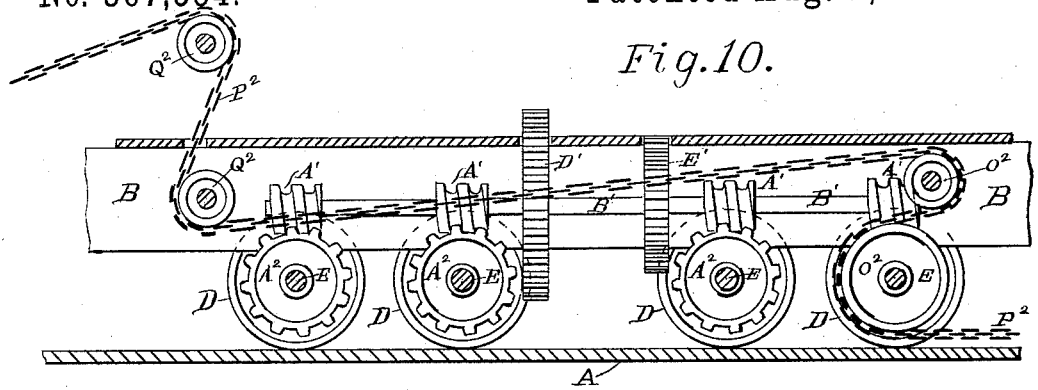
Figure 11:
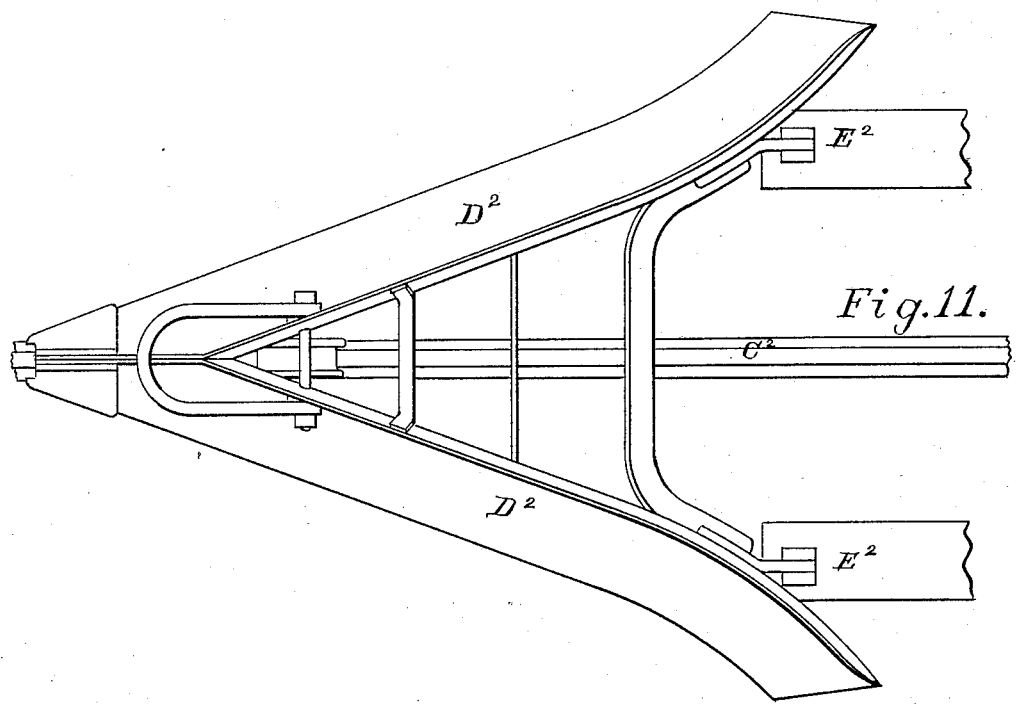
Figure 12:
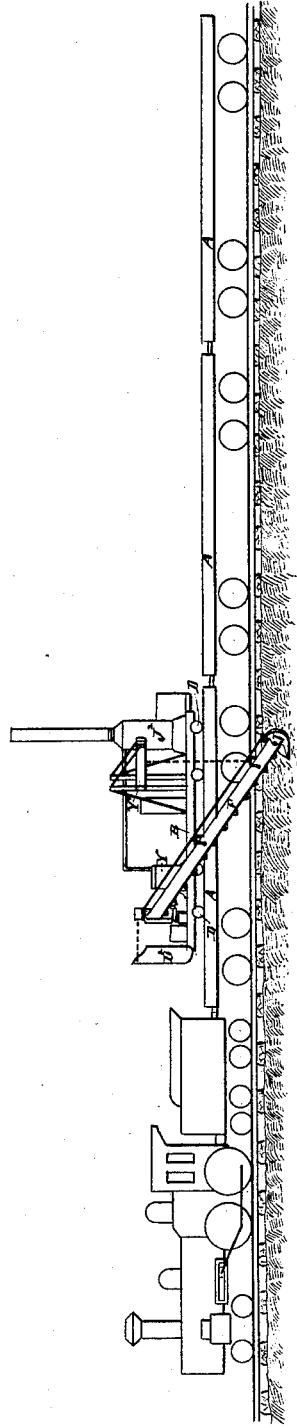

Figure 1 is a side elevation of the machine. Fig. 2 is a partial plan of the same. Fig. 3 is a part vertical section, and Fig. 4 a part plan, showing the method of gearing from the engine to the bucket-arms. Fig. 5 is a part vertical section, and Fig. 6 a part plan, showing the gearing for operating cranes and for propelling the machine. Fig. 7 is a part longitudinal section of one of the bucket-arms. Fig. 8 is a side elevation, and Fig. 9 is a plan, of a secondary form of scoop or plow. Fig. 10 shows a chain-connection to axles for propelling the machine by a positive movement. Fig. 11 is a part plan showing the plow in position to be used; and Fig. 12 is a side elevation of a train carrying the machine.

A represents a car of the train on which the machine operates; B, the frame or bed of the machine, supported by means of bearings on the wheels D and axles E.

F F are arms carrying the buckets G on the endless chain H.

J J are scoops or plows; K, the yokes in which the arms F are pivoted.

L L are links or arms supporting the strut I, which is pivoted at one end to the yoke K and at the other end to the scoop J. At M M are idler-wheels supporting the bucket-chains H.

N N are stands supporting the yoke K.

O is a bevel-gear, pivoted on the yoke K at its vertical axis and meshing with the intermediate gear, P, and through that with the bevel-gear Q on the shaft $R^3$, carrying the sprocket-wheels S S, which operate the bucket-chains H. These bucket-chains pass over other wheels on the shaft $W^2$ at the outer end of arms F, on which shaft the scoop J is also pivoted.

T is a bevel-gear concentric with and fast to the gear O. U is a pinion driving the same. Fast to the pinion-shaft is the gear V, driven through the intermediate W by the gear X, which receives motion from the engine Y through the bevel-wheels Z and Z', the latter being fast to the engine-shaft. These wheels are preferably friction-wheels, which may be thrown in or out of contact to stop or start the buckets G.

Y' Y' are power lifting-cranes adapted to lift the free ends of bucket-arms F F, which they take hold of at the eye X'. The upper pivots of the cranes are held by the uprights W' W'. On the pinion-shaft V' of the cranes is the bevel-gear U', which is driven by the gear T', pivoted on the casting forming the step of the crane-mast and central with the axis of the mast.

S' is a bevel-gear concentric with the gear T' and fast to the same.

$S^2$ is a pinion meshing with the gear S'. On the other end of the shafts R' R, carrying this pinion, is the gear Q', driven by the intermediate P', which meshes with the pinion O' on the engine-shaft.

On the shafts R' R are friction-clutches N', operated by the levers M', by means of which the cranes may be thrown into or out of action. These shafts carry, also, the friction-wheels L', clasped by bands which are tightened by means of hand-wheels K'. These are to hold the crane-drums from turning when out of action. The shaft R' carries, moreover, a double clutch, J', operated by the lever H'. Fast to the free ends of this clutch are the gears G' F', which drive the gears E' and D', respectively, the former through the intermediate C'. The gears E' and D' are fast to the worm-shaft B', and as one of these gears is driven direct from the shaft R', and the other through an intermediate, they move in opposite directions. Moreover, as the ratio of diameters of the gears G' to E' is different from that of the gears F' to D', the movement of the shaft B' is not the same in amount in one direction as in the other.

On the shaft B' are the worms A', meshing in the worm-gears A² on the axles E. These axles also carry guide-wheels B², formed to grasp the rail C², which is fastened to the car A and serves to guide the machine.

D² is a plough pivoted to the machine at E², so that it may be raised when out of use, as shown in Fig. 1.

F² G² are hoppers or guides to direct the material delivered by the buckets toward the center of the car.

H² is a tightener to take up slack in the bucket-chains.

J² is a boiler to supply steam to the engine Y.

K² is an adjustable outrigger or brace to hold the bucket-arm from movement toward or away from the car.

O² O², Fig. 10, are chain-wheels carrying the chain P², which is guided by the idlers Q² Q², and the ends of which are attached to the train of cars at any points remote from the machine front and rear.

The operation is as follows: At the outset the machine stands on the first car of the train to be loaded, next the engine. The plow is raised, and the bucket-arms (one or both) are let down until the scoop J is low enough in the ditch or earth to receive as much material as is desired. Power is applied to the bucket-chains, and the locomotive advances slowly. The material to be raised enters the scoop, and the motion of the train, combined with that of the moving buckets, raises the material to the top side of the bucket-arm. Not only, therefore, are the buckets filled, but also the space between them, which is closed by a belt or overlapping slats, V², is loaded. From this point the material is carried forward by the moving buckets and slats to the other end of the bucket-arm, where, as the buckets reverse in passing the shaft R³, the material drops from them into the hoppers F² G², and from them to the floor of the car. Meantime, by shipping the lever H' the worms A' are caused to turn the axles E in such direction as to move the machine backward, either by virtue of the adhesion of the wheels D, or through the chain-wheels O² O², meshing with the chain P², or through the combined action of both means.

The rate of movement of the machine backward is slow, to allow the cars to be completely loaded. The object of the linked strut I is to hold the bottom of the scoop J always horizontal, or nearly so. In conjunction with the pivoted arm F and the vertical yoke K, it will easily be seen that a parallel movement is obtained which accomplishes the desired result. When the train is loaded, the machine having reached the end farthest from the locomotive, is in a position to unload or force the material off the cars by means of the plow D². This is dropped onto the car-floor, as shown in Fig. 11, and (the train being in proper position and the arms F raised from the ground) the lever H' is reversed from its former position, causing the machine to move in the opposite direction. This forces the plow into and through the material on the cars, delivering the material from the cars.

The yoke K has a movement on a vertical axis in the stands N N, and the bucket-arm F is pivoted to the yoke on the horizontel shaft R³. This gives the arm a universal movement, making it possible to employ the scoop in the ditch, as stated, or above or below it, or near to or away from the car; also enabling the free end of the arm to be raised and swung inboard onto the car when the machine is not working.

In Fig. 7 is shown a hinged apparatus for cleaning out the buckets, which is not described here, as it is reserved to form the subject of another patent.

In case the form of scoop or plow J shown in Figs. 8 and 9 is used, the difference in the operation of the machine is that instead of pulling the train forward by the locomotive to scoop material from the ditch, it (the train) is pushed backward, as indicated by the arrow of Fig. 8.

It is not essential that either form of the scoops J be used, for if both are omitted, and therefore the linked strut I, which would no longer be essential, the buckets G will fill themselves by scooping the earth, when they are forced into it, by the locomotive pushing the train in the direction indicated by the arrow in Fig. 8. Nor is it essential that the machine move automatically on the cars, for it may be moved in various ways by hand. Neither are the buckets G essential features when the scoop J is employed, for if they were omitted, and the chains H carried only an endless succession of slats, or were replaced by an endless belt, the material would be deposited on this belt by the scoop, and the angle of the arm is usually such that the material would be carried forward to the car without the aid of the buckets.

The principle of our invention may be fulfilled without the use of the endless chains of buckets or the endless conveying-belt. Other mechanism may be substituted for lifting and depositing the material on the cars; but we consider it essential that the machine be supported on the cars on wheels or rollers in order that it may be moved with tolerable ease over the train.

What we claim as our invention is—

1. A ditcher and car-loader consisting of a machine resting on wheels or rollers mounted on a train of cars and provided with means for simultaneously digging earth from the ditch or bank and depositing said earth on the cars, and for propelling itself from end to end of the train, substantially as set forth.

2. Means for loading earth from the ditch or bank of a railroad, consisting of the combination of a train of cars mounted on wheels on the track of said railroad and suitably connected to a propelling-motor, with a machine mounted on wheels on said cars and provided with means for receiving, raising, and depositing earth from said ditch or bank onto said cars, and with suitable mechanism for propelling itself or being moved over said train, substantially as set forth.

3. In a railroad-ditching machine, the universally-pivoted arm F, carrying the scoop J, and means for conveying material from the scoop to a car on which the machine is mounted, in combination with yoke K, driving-shaft $R^3$, and their supporting and operating parts, substantially as described.

4. A ditcher and car-loader consisting of a carriage provided with mechanism which propels it over a train of cars and carrying a universally-pivoted arm F, provided with an endless chain of buckets and a scoop, J, in combination with a lifting-crane, Y', an operating-engine, Y, a boiler, $J^2$, and their connecting parts, substantially as described.

5. In combination with the vertically-adjustable bucket-arm F and the scoop J of a ditching-machine, the strut I, pivoted at one end to the yoke K, or its equivalent, and at the other end to the scoop J, to hold the bottom of the scoop in positions parallel to each other, substantially as set forth.

6. In a railroad-ditcher, the combination of the carriage B, bucket-arm F, axles E, supporting-wheels D, guide-wheels $B^2$, guide-rail $C^2$, and their connecting parts, substantially as described.

7. The combination of a train of cars, a ditching-machine provided with means for conveying material from the ditch to the cars, and with machinery for propelling itself over the train, and an unloading-plow attached to and forming a part of the machine, substantially as described.

8. In a ditching apparatus, the combination of a train of cars, a locomotive attached to the train, a machine mounted on wheels on said train, and having suitable appliances for raising and depositing earth thereon, the chain $P^2$, the chain-wheel (or wheels) $O^2$, and suitable mechanism for operating said wheel, substantially as and for the purpose set forth.

9. In combination with a railroad-ditching machine provided with means for raising and delivering material onto a train of cars and mounted on said train, suitable mechanism for propelling it forward and back over said train, said mechanism being geared to move the machine more rapidly in one direction than in the other, substantially as and for the purpose described.

ROBERT A. SHAILER.
FRANCIS W. KIMBALL.

Witnesses for Robert A. Shailer:
C. R. SCHINGLAN,
THEO. KANDELER.
Witnesses for Francis W. Kimball:
C. R. JACKWITZ,
NELLIE J. DAVIS.